United States Patent
Buckley

[11] 3,863,048
[45] Jan. 28, 1975

[54] ELECTRIC RESISTANCE HEATER COOKER FOR A FOOD PACKAGE

[76] Inventor: Morton C. Buckley, 5043 N. 20th Ave., Phoenix, Ariz. 85015

[22] Filed: July 11, 1973

[21] Appl. No.: 378,172

[52] U.S. Cl.................... 219/383, 99/358, 219/385, 219/432, 219/521
[51] Int. Cl. .............................................. H05b 7/18
[58] Field of Search .......... 219/383, 385, 386, 387, 219/403, 404, 432, 447, 521; 99/337, 358

[56] References Cited
UNITED STATES PATENTS

| | | | |
|---|---|---|---|
| 2,532,014 | 11/1950 | Davis | 219/383 |
| 2,889,765 | 6/1959 | Yetter | 99/358 X |
| 3,099,202 | 7/1963 | Palmer | 99/358 X |
| 3,167,431 | 1/1965 | Lee, Sr. et al. | 99/358 X |
| 3,330,203 | 11/1967 | Korr | 99/358 X |
| 3,385,952 | 5/1968 | Mix | 219/387 |
| 3,483,358 | 12/1969 | Eisler | 219/385 |
| 3,543,673 | 12/1970 | McDevitt et al. | 99/358 |
| 3,565,642 | 2/1971 | Hirsch | 99/358 |
| 3,573,430 | 4/1971 | Eisler | 219/385 |
| 3,771,433 | 11/1973 | King | 99/358 X |

Primary Examiner—Volodymyr Y. Mayewsky
Attorney, Agent, or Firm—John A. Robertson

[57] ABSTRACT

Two embodiments of the basic concept of providing a food package comprising wall structure enclosing a food portion and carrying a pair of electrodes in engagement with the food portion with a tab integral with each electrode and extending to the exterior of the package, together with an electric cooker for said package comprising walls defining a cooking chamber, with one of the walls being removable from the other walls to provide an access opening for introducing the food package into the cooking chamber, a pair of spring-biased contacts carried by the walls and in conductive engagement with said tabs when the food package is received in the cooking chamber and the movable wall is in closed position, together with an electric circuit including a pair of conductors terminating in a plug that is received in an outlet receptacle to provide electric current, and a normally open switch included in the circuit of said conductors mounted on the walls of the cooker and which is closed by the movable wall when the latter is in closed position, and a terminator for interrupting the circuit to said contacts upon completion of a pre-determined cooking period.

6 Claims, 12 Drawing Figures

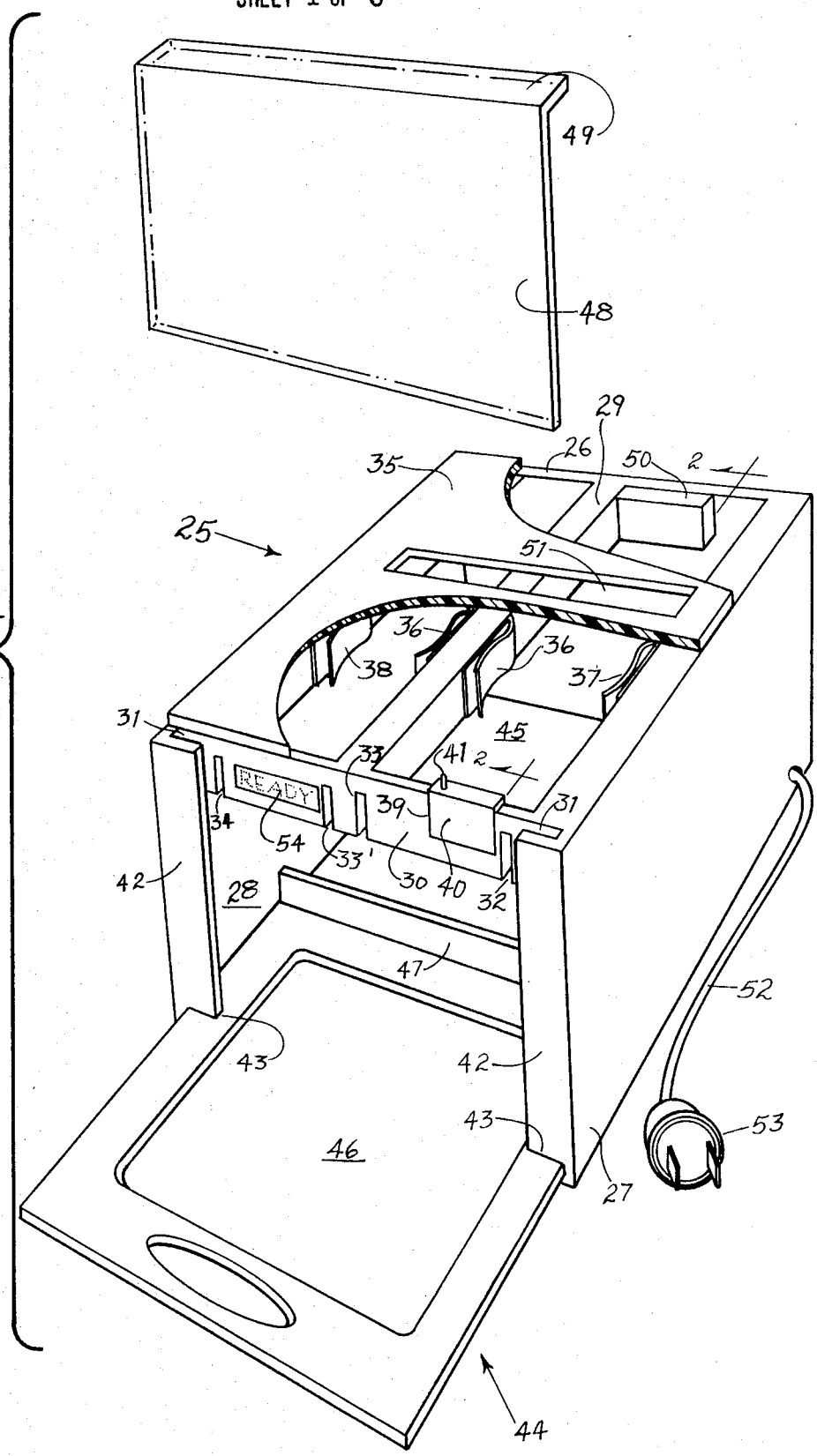

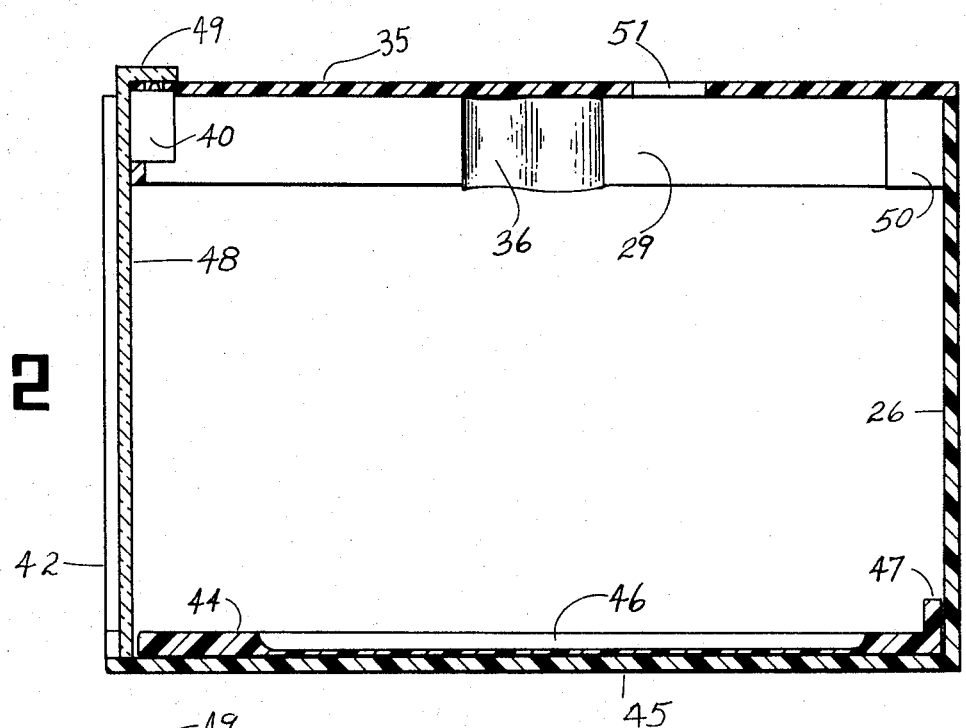
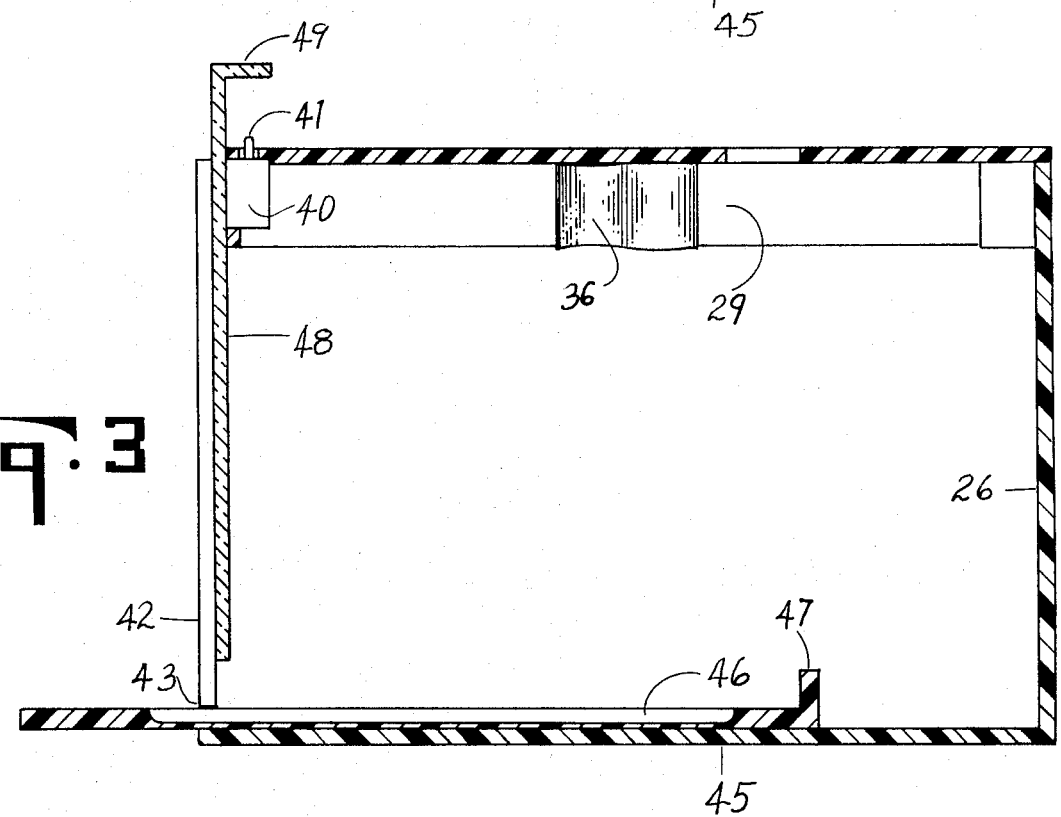

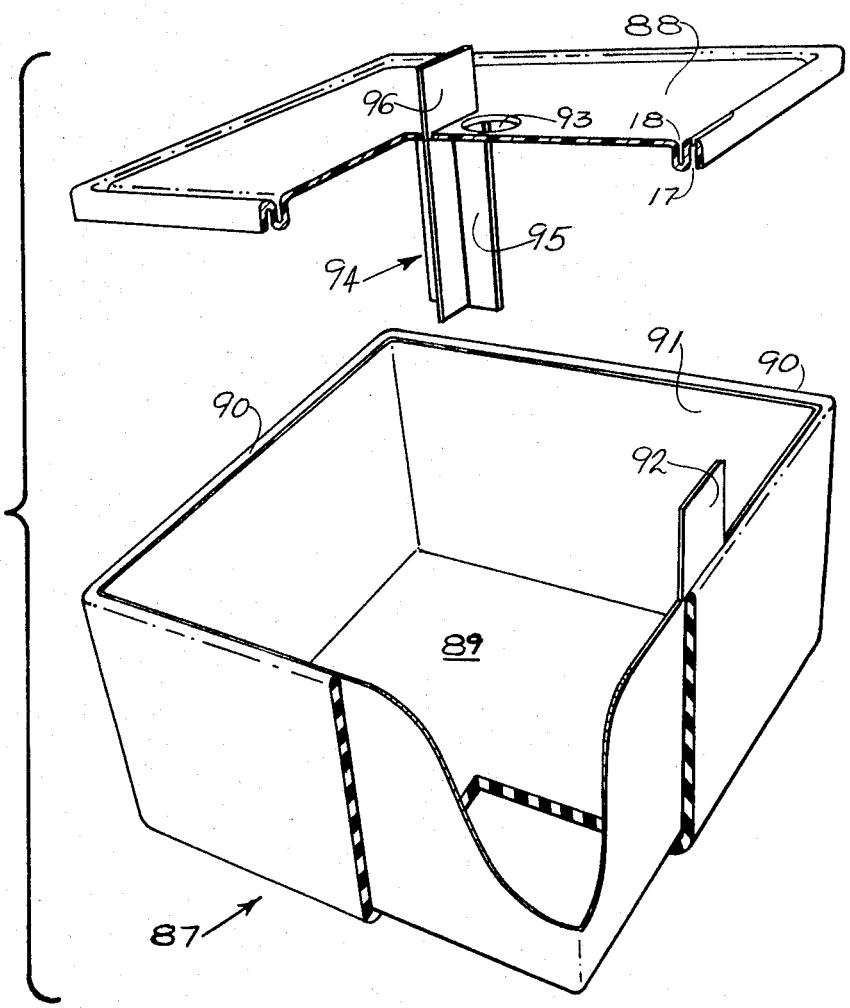
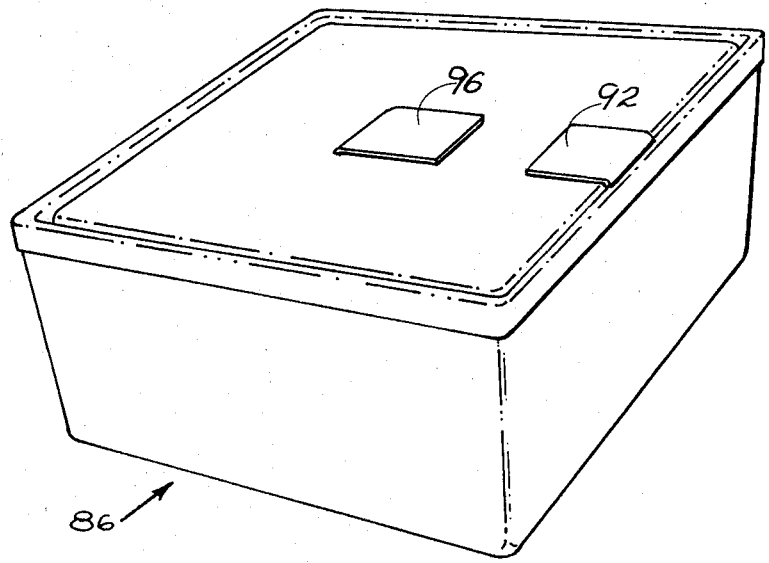

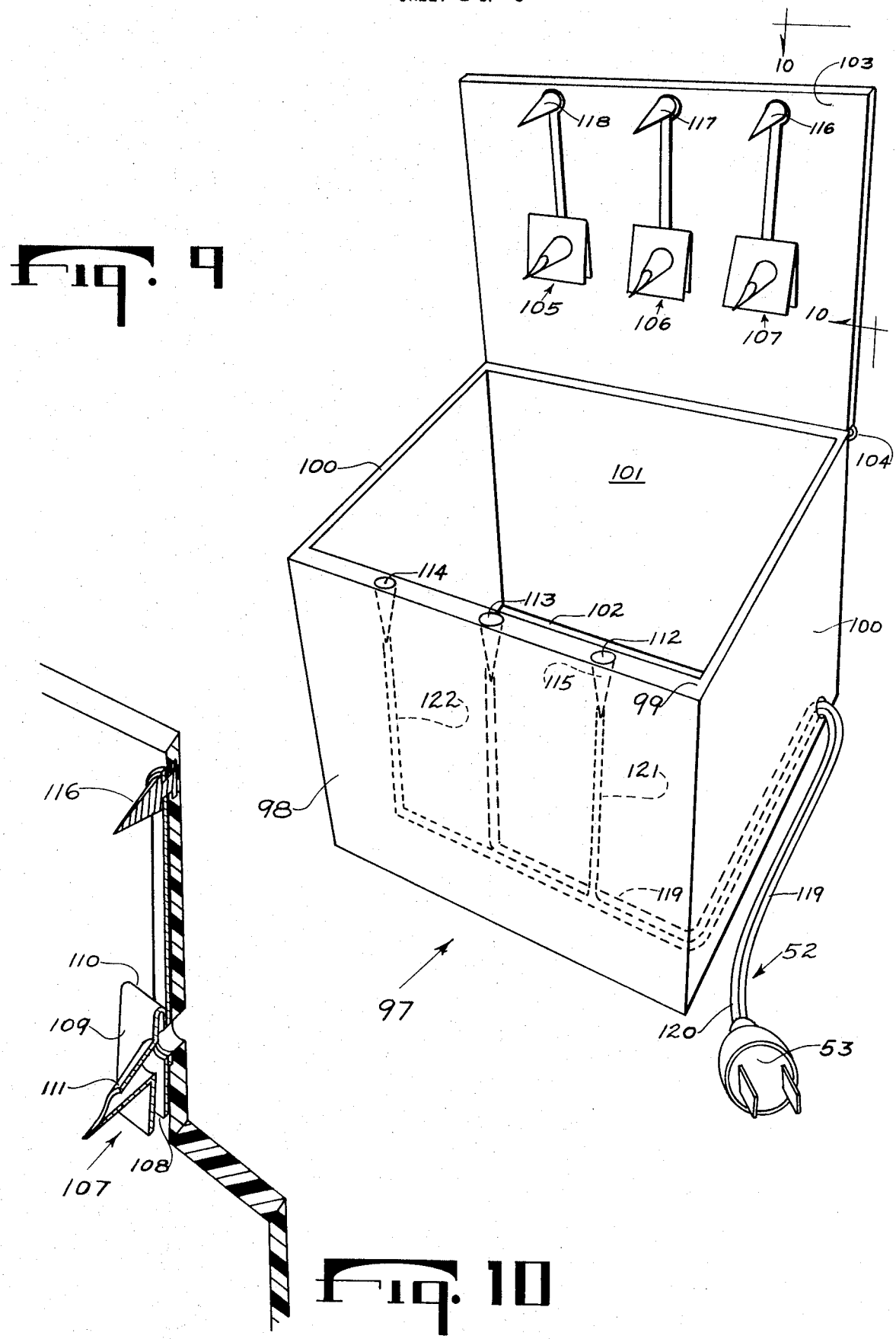

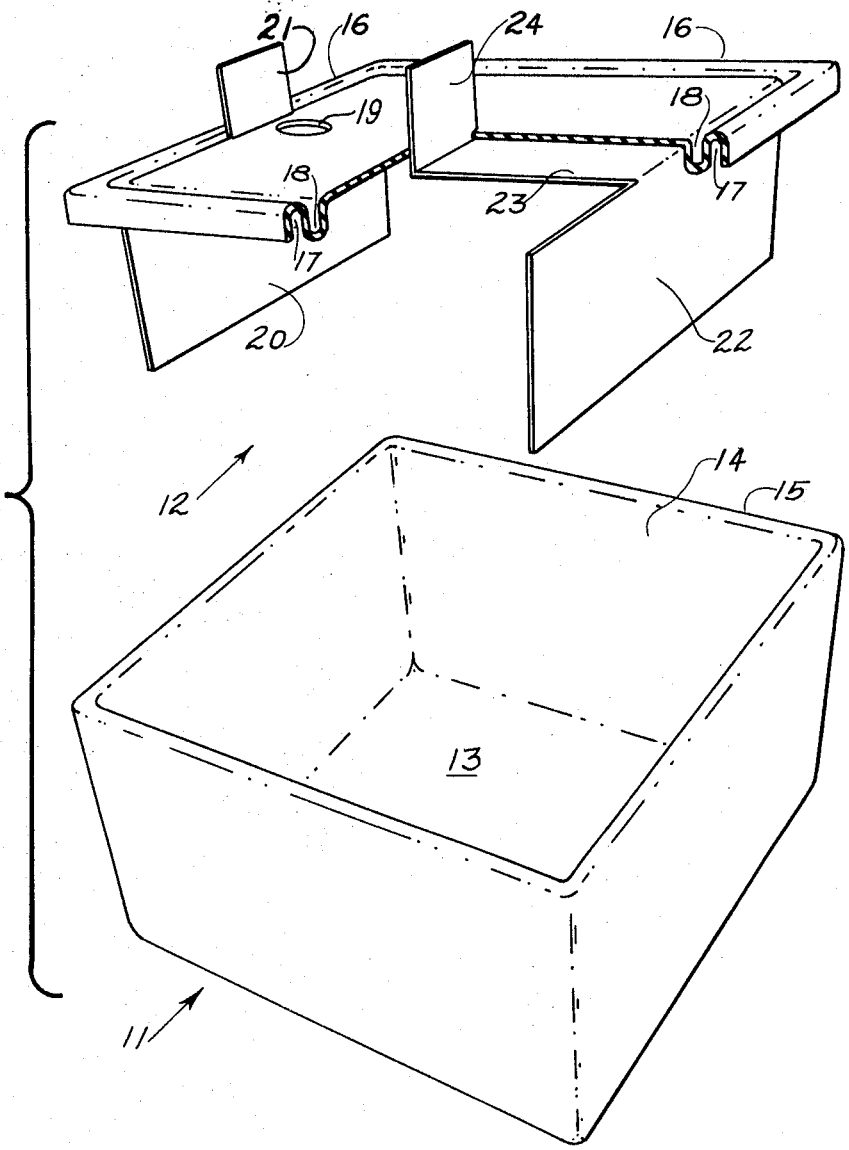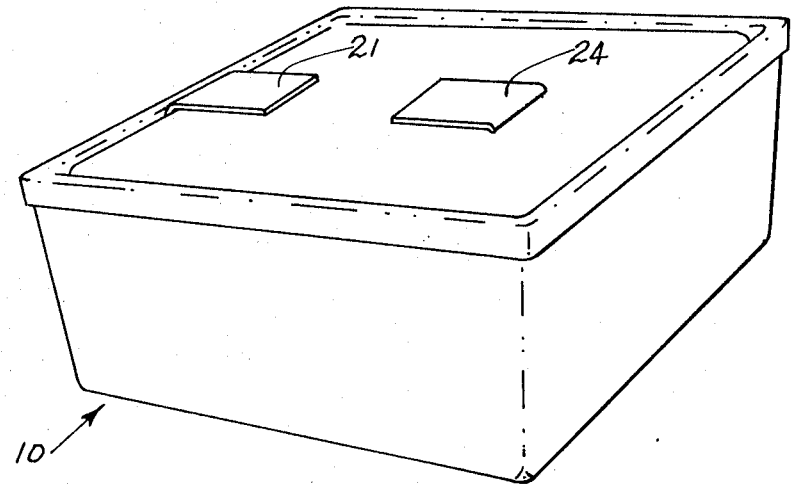

ELECTRIC RESISTANCE HEATER COOKER FOR A FOOD PACKAGE

The present invention relates to a food package and apparatus for electrically cooking the food in said package and is concerned primarily with a package of a particular structural design which is received in an electric cooker designed to receive that particular package and which passes electric current through the food in the package to achieve cooking of the same.

BACKGROUND OF THE INVENTION

At the present time, the practice of selling food in coin-operated vending machines is far-flung and widespread. Vending machines for such foods are installed in office buildings, factories, schools and comparable institutions. The major portion of the foods which are so vended require heating either for the purpose of bringing them to a palatable temperature or for actual cooking of the food. Because of this requirement, it is now the common, if not universal, practice for the installers of the vending machines to provide heating apparatus which is intended primarily to heat the food packages which are taken from the vending machines. However, it has been found that in many instances this heating apparatus is used to heat and/or cook foods which are not derived from the vending machines. Thus, an employee in a factory or a student in a school will often bring a particular food portion with him and take advantage of the heating apparatus provided by the installer of the vending machine to heat or cook this food. This, of course, results in no profit or benefit to the owner of the apparatus.

From the aspect of practical utility, it is highly important that a food package which is taken from a vending machine be susceptible of being heated or cooked in a comparatively short interval. For this reason, substantially all of the heating apparatus now provided for this purpose are microwave ovens which are highly susceptible to becoming disordered and therefore inoperative. This is, of course, a detriment to the installer of the vending machine as it impairs his reputation.

While it is known to provide food packages in which the food content is cooked by passing an electrical current therethrough and it is also known to provide cooking apparatus for such packages, the known arrangements of this type have met with little if any public acceptance for several reasons.

In the first place, the apparatus must meet the requirements of the United Laboratories. Thus, they must be literally fool-proof and have the capability of completing the electrical circuit which passes the electric current through the food only when a totally safe condition exists. The optimum condition is when a food package is completely received and enclosed by the cooking apparatus. Then, again, the cooker should be the epitome of simplicity so as to reduce to a minimum the possibility of it becoming disordered and inoperative. Finally, it should be susceptible of manufacture at low cost.

OBJECTS OF THE INVENTION

With the foregoing conditions in mind, the present invention has in view the following objectives:

1. To provide a food package comprising wall structure which encloses a food portion having a liquid content and which carries a pair of electrodes, each having a tab integral therewith which extends to the exterior of the package, with the tabs being engageable by spring-biased contacts of electric cooking apparatus.

2. To provide, in a food package of the type noted, a top wall that is formed with an aperture which is normally closed as during handling of the package by one of the tabs which is folded thereover.

3. To provide, in a food package of the character aforesaid, tabs which are normally folded flat against the top wall of the package but which may be bent into upright positions to facilitate engagement with spring-biased contacts in the cooking apparatus.

4. To provide an electric resistance cooker for a food package of the kind described and which includes walls defining a cooking chamber and one of which is removable from the other walls to provide an access opening through which a food package is introduced into the cooking chamber.

5. To provide, in an electric resistance cooker of the type noted, a pair of spring-biased contacts which are in conductive engagement with the tabs of a package in the cooking chamber and the movable wall thereof is in a closed position.

6. To provide, in an electric resistance cooker of the character aforesaid, an electric circuit which connects the contacts to a source of electric current and which includes a normally open switch which is closed when the movable wall of the cooker is in a position closing the access opening to the cooking chamber.

7. To provide, in an electric resistance cooker of the kind described, a terminator which interrupts the circuit to the contacts upon the completion of a predetermined cooking period.

8. To provide, in an electric resistance cooker of the type noted, a cooking chamber having a vertical wall which is normally open to afford access thereto, together with a sliding wall for closing this access opening and which when in closed position closes the normally open switch aforesaid.

9. To provide, in an electric resistance cooker of the character described, a cooking chamber having a normally open top which is closed by a hingedly mounted cover which carries spring-biased contacts which pierce and engage tabs on a food package, and elements of a switch with complemental elements of the switch being mounted on a vertical wall of the cooker, said switch elements being engaged when the cover is in closed position.

10. To provide, in an electric resistance cooker of the kind aforesaid, a visible signal for indicating the termination of a cooking period.

Various other more detailed objects and advantages of the invention, such as arise in connection with carrying out the above ideas in a practical embodiment, will, in part, become apparent, and, in part, be hereafter states as the description of the invention proceeds.

SUMMARY OF THE INVENTION

The foregoing objects are achieved by the two embodiments herein disclosed. In one embodiment the food package is rectangular, preferably square, presenting opposed walls in spaced relation. An electrode in the form of a foil or film substantially completely covers the inner face of each of these spaced walls. A tab is integral with each of these electrodes and projects above the top wall of the package. One of these tabs is located midway of the electrode to which it is joined and projects vertically beyond the top edge thereof. The other tab is connected by a strip located on the under face of the top wall, with the strip being joined midway the ends of the other electrode, with the tab projecting above the top wall substantially in the center thereof. These tabs are normally folded flat against the upper face of the top wall and one of them closes an aperture in the top wall when in this folded flat condition.

The cooker for this package is also of rectangular shape and comprises a top wall having a median beam extending longitudinally thereof and depending therefrom, a rear wall, a pair of side walls, a front which is normally open to provide an access opening for a food package, and a bottom wall in the from of a sliding tray on which a food package is deposited when the tray is in an extended position. A sliding front wall closes the open front when the tray with the package thereon is moved into the cooking chamber defined by the side and rear walls. This sliding front wall is formed at its upper edge with an inturned flange which engages a normally open switch when the front wall is in fully closed position.

A pair of spring-biased contacts in the form of spring clips are mounted on the opposite sides of the median beam substantially midway its ends. Two other spring clips are mounted on the inner faces of the side walls at their upper edges and in confronting relation to the spring clips on the beam.

An electric circuit is provided which includes a pair of conductors terminating in a plug that is intended for insertion in an outlet receptacle. These conductors complete the circuit to a pair of the confronting spring clips to the exclusion of the other pair. Also included in this circuit is the normally open switch aforesaid, a terminator for interrupting the circuit to the contacts upon completion of a cooking period, and a signal light for indicating the termination of the cooking period. The terminator may be of any of three types as will later be described in detail.

In the operation of this embodiment, the sliding front door is removed, the bottom tray extended and a food package of the type aforesaid deposited on the tray and the tabs bent into an upward vertical position in which they are parallel to the side walls. The tray is now slid inwardly to move the food package into the cooking chamber, during which movement the tabs on the package engage one pair of the confronting spring clips. The sliding front wall is now positioned and the flange thereon engages the normally open switch to close the latter and complete the circuit to the contacts. The electrical current now passes from these contacts to the tabs and electrodes and through the food portion in the package. The resistance of the latter to the passage of this current results in the cooking of the food to the required degree. This cooking period is automatically terminated by any of the three terminators to be hereinafter described, whereupon the signal light is illuminated to advise the user of the fact that the food in the package has been cooked and is ready for removal by withdrawing the tray.

In the other embodiment, the food package is also rectangular in shape, preferably square, and comprises a bottom wall, side walls upstanding therefrom, and a removable top wall. These walls are of electrical insulating material and which also preferably have heat insulating qualities. An electrode in the form of a foil or film completely lines the inner surface of the four side walls. A tab is formed integral with this electrode and projects above one side wall substantially midway its extremities. A second or central electrode is mounted on the top wall substantially at the center thereof and extends from the underface thereof to the bottom. A tab is integral with this electrode and projects above the top wall. This top wall is formed with an aperture adjacent to this tab which is closed when the tab is folded flat against the upper face of the top wall. The tab extending from the electrode on the side wall is also folded flat over the top wall. A food portion having a liquid content is received in the space defined by the wall structure aforesaid and is in contact with the electrodes.

The electric resistance cooker for this food package comprises a bottom of a rectangular shape corresponding to that of the package, side walls upstanding from the bottom, the upper edges of which define an open top, and a cover or top wall which is hingedly mounted on the upper edge of one of the side walls. Mounted on the inner face of this cover are three spring-biased piercing contacts, any two of which pierce the tabs on a food package which is deposited in the cooking chamber defined by the wall structure. Also mounted on the inner face of the cover adjacent to the edge remote from its mounting are three elements of a switch in the form of conical contacts. Opening onto the top edge of the side wall opposite to the hinged mounting of the cover are three recesses, each having a hollow, conical liner which receives one of the conical contacts on the cover.

While the terminator and signal light for this embodiment are included therein, they are not illustrated because they are the same as that described above in connection with the first embodiment.

In operation, a food package with the tabs folded flat over the top face of the cover is deposited into the cooking chamber defined by the side walls with the tab projecting from a side wall being spaced from the hinged mounting of the cover. The latter is swung downwardly into closed position, whereupon the central spring contact on the cover pierces the tab on the central electrode. At the same time, one of the spring-biased contacts on either side of the central contact pierces the tab which has been folded down over the top of the cover. Also, the three conical switch contacts on the cover are received in the three female contacts on the side wall to complete the circuit to the two tabs which have been pierced by the two spring-biased contacts.

For a full and more complete understanding of the invention, reference may be had to the following description and the accompanying drawings wherein:

FIG. 1 is a perspective illustrating the electric resistance cooker of one embodiment and the sliding front wall in exploded relation, with portions of the top wall broken away to permit illustration of the interior of the heater;

FIG. 2 is a longitudinal vertical section of the cooker illustrated in FIG. 1 with the front wall in fully closed position, being taken on the plane of the line 2—2 of FIG. 1;

FIG. 3 is a longitudinal vertical section similar to FIG. 2 illustrating the front wall in a partially upraised position;

FIG. 7 is a perspective illustrating one embodiment of the food package with the top wall in exploded relation and portions of the side walls broken away;

FIG. 8 is a perspective depicting the food package of FIG. 7 in closed position, with the tabs folded flat and ready for depositing in one embodiment of the electric resistance heater;

FIG. 9 is a perspective of the electric resistance cooker of the second embodiment;

FIG. 10 is a detailed perspective taken on an enlarged scale of the cover of FIG. 9, with a portion thereof broken away and shown in section, being taken on the plane of the lines 10—10 of FIG. 9;

FIG. 11 is a perspective illustrating in exploded relation the elements of the food package which is used with the electric resistance heater of both embodiments, and FIG. 12 is a perspective of the food package of FIG. 11.

DESCRIPTION OF THE FIRST EMBODIMENT

The Food Package

Figure 5:
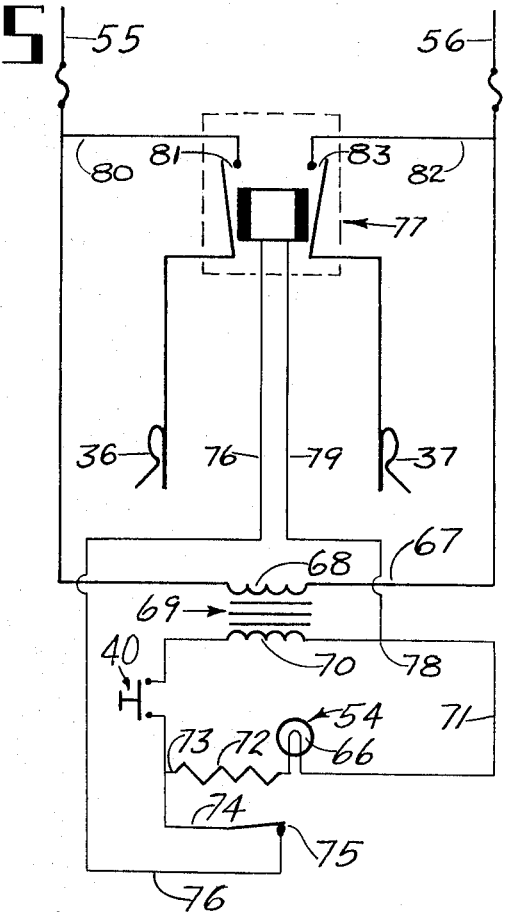
FIG. 5 is another schematic view illustrating the wiring diagram for a second terminator.

Referring now to the drawings, wherein like reference characters denote corresponding elements throughout the several views, and first more particularly to FIGS. 11 and 12, the food package of this embodiment is described as follows. The package as illustrated in FIG. 12 is designated 10. It comprises a main body wall structure referred to in its entirety as 11 and a cover designated generally 12. The wall structure 11 is of an electrical insulating material which also preferably should have heat insulating properties. It comprises a bottom 13 of rectangular shape, and preferably square as illustrated. Upstanding from the side edges of bottom 13 are four side walls 14 presenting top edges 15. Cover 12 is also of electrical insulating material and is of square shape presenting four side edges 16. Immediately adjacent to each side edge 16, cover 12 is formed with a downwardly opening groove 17 which receives an upper edge 15 of a side wall 14 with a pressed or snap fit which assures that the cover may be securely positioned on the walls 14 and yet readily removed therefrom. Immediately adjacent to each downwardly opening groove 17 is an upwardly opening groove 18 which imparts resiliency to the walls defining the adjacent groove 17. Cover 12 is also formed with an aperture 19 which when open permits the escape of steam which may be generated by heating the liquid content of a food portion which is received in the main body portion 11.

Immediately adjacent to one side edge 16 of cover 12, an electrode 20 depends from the cover and integral with this electrode 20 is a tab 21 which projects above the top face of cover 12. This tab 21 passes through a slit in cover 12 substantially midway the extremities of the adjacent side edge 16. A second electrode 22 depends from the underside of cover 12 immediately adjacent to the inner wall of a groove 18. Electrodes 20 and 22 are of a foil or film having good electrical conducting properties. A strip 23 has one end integrally joined to electrode 22 at the upper edge thereof and midway its longitudinal extremities. Strip 23 underlies the cover 12 and extends to a slit substantially midway opposed side edges of cover 12 where a tab 24 is bent upwardly therefrom and extends through this slit.

After a food portion is deposited in main body portion 11, cover 12 is positioned so that the electrodes 20 and 22 line opposed side walls 14 and are in intimate engagement with the food. Tab 21 is folded inwardly to cover aperture 19 and tab 24 folded down so as to assume a position substantially centrally of cover 12.

The Electric Resistance Cooker

Referring now more particularly to FIGS. 1, 2 and 3, the structure of the resistance cooker for the package of FIGS. 11 and 12 will be described. The cooker is designated generally 25. It comprises a rear wall 26 of an electrically insulating material, such as any of the well known plastics having this property, and side walls 27 and 28 which extend forwardly from rear wall 26. A beam 29 extends forwardly from rear wall 26 at the top edge of the latter and midway its sides. A front cross strut 30 is joined to the forward end of this beam and extends between the top edges of side walls 27 and 28. Immediately in front of the cross strut 30, side walls 27 and 28 are formed with slots 31 which extend throughout the entire vertical extent of these side walls. Opening into the bottom edge of cross strut 30 are four slot-like recesses 32, 33, 33' and 34. A top wall 35 of an electrically insulating material is mounted on the upper edges of side walls 27 and 28 and beam 29.

A pair of spring clips 36 are mounted on the opposed side faces of beam 29 substantially midway the longitudinal extent thereof. Another spring clip 37 is mounted on the inner face of wall 27 adjacent to the upper edge thereof and in confronting relation to a spring clip 36. Another spring clip 38 is similarly mounted on side wall 28 confronting the other spring clip 36. It is to be noted that each of the spring clips 36, 37 and 38 includes a movable element which constitutes a spring-biased contact as will be later described. Cross strut 30 is formed with a recess 39 which opens onto its upper edge and which perceives a normally open switch 40 having a plunger 41 which when depressed closes switch 40.

The front edges of side walls 27 and 28 are formed with inturned flanges 42, the upper portions of which partially define the slots 31. The lower ends of these flanges 42 are formed with slot-like recesses 43 which open onto the inner ends of the flanges. A sliding tray designated generally 44 has its side edges slidably received in recesses 43 and slides over bottom wall 45 of the cooker. The upper face of tray 44 is formed with a shallow recess 46 which receives the lower portion of a food package 10. Tray 44 also includes an inner end flange 47 which abuts rear wall 26 when tray 43 is in fully closed position. A sliding front wall 48 is formed with an inturned flange 49 at its upper edge. This wall 48 is of a transparent material, such as glass or plastic. Front wall 48 slides in slots 31 and along the inner faces of flanges 42 into a position in which it engages bottom wall 45 after tray 44 is in its fully inserted position, as illustrated in FIG. 2. When front wall 48 is in this fully closed position, flange 49 engages plunger 41 to close switch 40.

Mounted on the inner face of rear wall 26 adjacent to its upper edge and beam 29 is a terminator 50 which interrupts the circuit to the clips 36 and either 37 or 38 when a pre-determined cooking period is terminated. Top wall 35 is formed with a transverse opening 51 to permit the escape of steam which might come from aperture 19. A cable 52 has a plug 53 at one end for insertion into a conventional outlet receptacle and includes a pair of conductors, one of which is connected to the spring clips 36 and the other to the spring clips 37 and 38. Switch 40 is also included in the circuit of the conductors. A visible signal is indicated at 54 and may comprise a translucent panel having the term "Ready" displayed thereon and an electric lamp therebehind which is included in the circuit of the clips 36, 37 and 38.

Operation — First Embodiment

It is believed advisable at this point to briefly describe the operation of the mechanism outlined above before describing the details of the terminators.

With a food package 10 in the condition of FIG. 12, the tabs 21 and 24 are bent upwardly into the vertical positions depicted in FIG. 11. Door 48 is removed from the open front and tray 44 pulled out into a fully extended position as determined by flange 47. Package 10 is then deposited in the recess 46 of tray 44 with the side tab 21 aligning with one of the slots 32 and the central tab 24 with one of the slots 33 or 33'. Plug 53 is inserted in an outlet receptacle, whereupon tray 44, together with package 10, is moved inwardly into the space between side walls 27. As this movement nears its end of completion, central tab 24 will be received in one of the spring clips 36 and side tab 21 in one of the spring clips 37 or 38. It is evident that the package 10 may be positioned indiscriminately because it makes no difference as to which pair of spring clips is rendered effective. Front wall 48 is now inserted through slots 31 and moved downwardly into the position of FIG. 2 in which flange 49 engages plunger 41 of the normally open switch 40 to close the latter. Current will now pass through the conductors included in cable 52 through switch 40, the effective pair of spring clips 36 and either 37 or 38, and terminator 50. The current is conducted from the spring contacts through tab 21 to electrode 20, from the latter through the food having a moisture content to electrode 22, and from this electrode through strip 23 to tab 24 to clip 37 or 38 as the case may be. Upon termination of the pre-determined cooking period, the circuit is interrupted, at which time the visible signal 54 is illuminated.

It is evident that the foregoing structural arrangement embodies the factor of safety to the highest degree because it is impossible to complete the circuit until the tray 46 with the food package 10 thereon is fully inserted into the cooking chamber of heater 25 and door 48 moved to a fully closed position.

The Terminators

Figure 4:
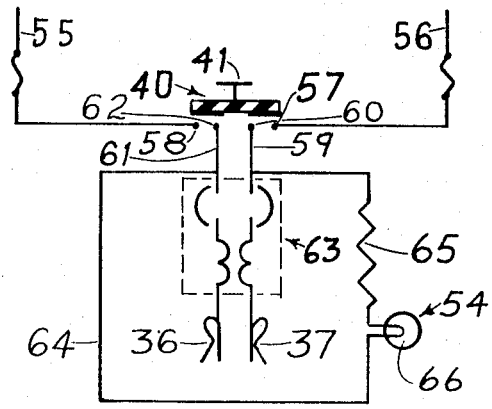
FIG. 4 is a schematic view illustrating the wiring diagram for one type of terminator.
Figure 6:
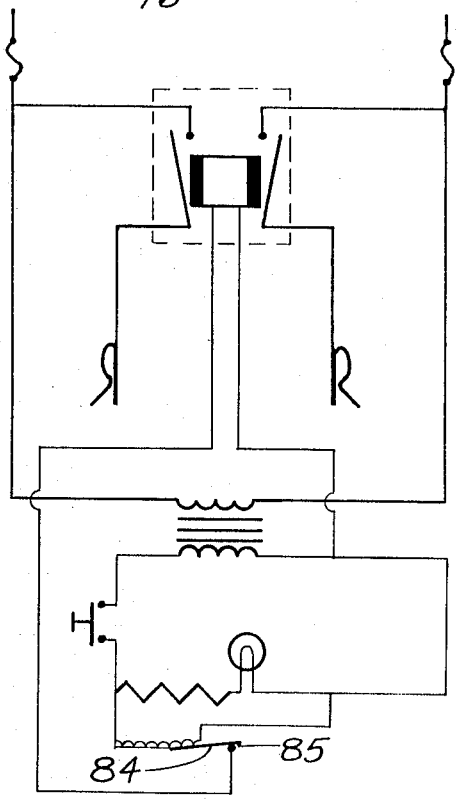
FIG. 6 is a schematic view illustrating the wiring diagram for a third terminator.

Referring now to FIGS. 4, 5 and 6, three forms of terminators are therein diagrammatically illustrated. Thus, as shown in FIG. 4, conductors 55 and 56 are those which are included in cable 52. The switch 40 is indicated as being a two-pole push button switch. Thus, conductor 56 ends in a terminal 57, while conductor 55 ends in a terminal 58. A line 59 has a terminal 60 which is adapted to be connected to terminal 57 when switch 40 is closed. Likewise, another conductor 61 has a terminal 62 which is connected to terminal 58 when switch 40 is closed.

This wiring diagram represents the condition which is achieved when one of the clips 36 and 37 are effective. Thus, line 59 extends to clip 37 while line 61 extends to clip 36. A circuit breaker 63 is included in the lines 59 and 61 and is effective to break the circuit to the contacts 36 and 37 when a pre-determined resistance in the food beig cooked is reached. This circuit breaker is one which automatically resets. A conductor in the form of a loop 64 extends from line 59 in advance of the circuit breaker to the line 61, also in advance of the circuit breaker. A resistor 65 is included in this loop 64, as is a lamp 66 which is a part of the visible signal 54.

In operation, when switch 40 is closed, current flows through line 61 to contact 36 through the food to contact 37 and back through line 59. As the resistance to the passage of electric current through the food is increased and it takes more amperage to pass the current through the food, when a pre-determined amperage is reached, the circuit breaker 63 interrupts the circuit to the contacts 36 and 37.

Before this takes place, little or no current will pass through the loop 64 because of the presence of the resistor 65. It is a well known phenomenum that electricity seeks the path of least resistance. Thus, when the circuit breaker interrupts the circuit to the contacts, the current will pass through loop 64 including resistor 65 to energize lamp 66. As mentioned above, the circuit breaker 63 automatically resets and restores the terminator to a condition for the next cooking period.

Referring now to FIG. 5, the terminator is provided which is rendered effective by a thermostat which responds to ambient temperature, that is the temperature within the cooking chamber of the cooker 25. Conductors 55 and 56 are connected by a line 67 which includes the primary 68 of a transformer 69. The secondary of the transformer is shown at 70 and is included in a loop 71 which also includes switch 40, a resistor 72, and a lamp 66. The resistor 72 is connected to loop 71 at 73 and from this point a conductor 74 extends to a thermostatically operated switch 75. The thermostat of switch 75 is responsive to changes in ambient temperature and opens when the temperature reaches a pre-determined degree. From switch 75 another line 76 extends to the coil of a two-pole magnetic switch represented at 77. From a point 78 in loop 71, a line 79 extends to the coil of switch 77. A conductor 80 extends from conductor 55 to a switch 81 included in magnetic relay 77 and thence to spring contact 36. Another conductor 82 extends from conductor 56 to another switch 83 included in magnetic relay 77 and thence to contact 37.

In operation, both switches 81 and 83 of magnetic relay 77 are normally open. With current being delivered to conductors 55 and 56, primary 68 is energized to generate current in secondary 70. When switch 40 is closed, current from this secondary flows from one side of switch 40 through line 74, thermostatic switch 75, and line 76 to the coil of magnetic relay 77. It then flows back through line 79 to loop 71 on the other side of transformer 69. Thus, switches 81 and 83 are closed to cause current to pass through lines 80 and 82, contacts 36 and 37, and the food in package 10. This condition continues until the ambient temperature at switch 75 reaches a pre-determined degree, whereupon this switch opens to interrupt the flow of current in line 76 to the coil of the relay. Thus, switches 81 and 83 are now open to interrupt the current through clips 36 and 37 and the food.

During the cooking operation, little or no current will flow through lamp 66 because of resistor 72. However, when thermostatic switch 75 opens, current flows from point 73 through resistor 72 to lamp 66 and thence through loop 71 back to the other side of switch 40. The terminator of FIG. 5 is reset by the ambient temperature falling to a point below that at which the thermostat opens switch 75.

The terminator of FIG. 6 includes substantially the same wiring diagram above described in connection with the terminator of FIG. 5, with the difference that in place of the switch 75 which is responsive to changes in ambient temperature, a time delay relay is included as indicated at 84. This time delay relay 84 comprises a bi-metallic strip which is heated by an electric current passing therethrough to the point where it bends to break the circuit at the switch indicated at 85.

DESCRIPTION OF THE SECOND EMBODIMENT

The Food Package

Referring now more particularly to FIGS. 7 and 8, the package for this embodiment is indicated generally at 86. It comprises a main body portion 87 and a removable cover 88. Main body portion 87 comprises a bottom wall 89 of rectangular shape, preferably square, from which upstand four side walls 90. These walls 90 are of electrical insulation which also preferably has good heat insulating properties. An electrode 91 of a metallic foil or film extends completely around the inner faces of the four side walls 90 with a tab 92 projecting upwardly beyond the top edge of one of the side walls midway thereof. Cover 88 is also of an insulating material and has a groove structure along its four side edges which is similar to the grooves shown at 17 and 18 in FIG. 1.

Cover 88 is formed with an aperture 93 near the center thereof and adjacent to this aperture an electrode designated generally 94 depends from cover 88 and extends to bottom wall 89. Electrode 94 comprises four vanes 95 which are equi-angularly spaced apart and has a tab 96 which projects upwardly through a slit in cover 88 adjacent to an aperture 93 so that it may be folded thereover. After a portion of food is deposited in main body portion 87, cover 88 is positioned and tabs 92 and 96 bent over into engagement with the upper surface of cover 88. The package is now in condition for being deposited in the electric resistance cooker now to be described.

The Electric Resistance Cooker of the Second Embodiment

Referring now to FIGS. 9 and 10 the cooker is designated generally 97. It is of rectangular shape corresponding to the configuration of package 86 and comprises a front wall 98 presenting a top edge surface 99, side walls 100, a rear wall 101, and a bottom 102. The walls 98, 100 and 101 and bottom 102 are of electrical insulating material. The upper edges of front wall 98, side walls 100 and rear wall 101 define an open top which is closed by a cover 103 of insulation which is hingedly mounted to the upper edge of rear wall 101 as indicated at 104. Mounted on the inner face of cover 103 are three spring-biased contacts designated generally at 105, 106 and 107. These contacts 105, 106 and 107 are of identical construction and upon referring to FIG. 10 the construction of one of them is described in detail.

Thus, contact 107 is shown as comprising a spring clip having a fixed base 108 which is secured to the under face of cover 103 and a movable leaf 109 joined to base 108 by a bend 110. Extending outwardly from leaf 109 is a hollow, conical, pointed penetrating element 111. Needless to say, these contacts are arranged in alignment as indicated in FIG. 9 and spaced relative to the edges of cover 103 so that when a package 86 is deposited in main body portion 87, central contact 106 will pierce tab 96 and one of the outermost contacts 105 or 107 will pierce the tab 92 depending on the position of package 86 in main body portion 87.

Opening onto edge surface 99 of front wall 98 are three conical recesses 112, 113 and 114. Each of these recesses is lined by a hollow, metallic, conical member 115 constituting the female element of a switch. Projecting from the undersurface of cover 103 along the edge remote from the hinged mounting 104 are three solid, conical, metallic contacts 116, 117 and 118 which are arranged so that when cover 103 is swung into closed position, they are received in female contacts 115 of recesses 112, 113 and 114. The cable which corresponds to the cable 52 of FIG. 1 has the usual plug 53 and includes a pair of conductors 119 and 120. It will be noted from the dotted line illustrations of FIG. 9 that conductor 119 extends to and is connected to the lower end of the female contact 115 in recess 113. Conductor 120 is connected by a branch line 121 to the female contact in recess 112, while another branch line 122 extends from conductor 120 to the female contact 115 in recess 114.

Cooker 97 includes a push button switch similar to the switch 40 of the device of FIG. 1 which is not illustrated in FIG. 9 because of the desire to clarify the illustrations of the drawings without rendering them unduly extensive. Cooker 97 also includes a terminator comparable to the terminator 50 of FIG. 1 and which may be of any of the three types illustrated in FIGS. 4, 5 and 6.

Operation — Second Embodiment

With plug 53 received in an outlet receptacle and cover 103 in an open position, a package 86 is deposited in cooker 97 with tab 92 located along one of the side walls 100. Cover 103 is now swung downwardly into closed position in which conical contacts 116, 117 and 118 are received in the recesses 112, 113 and 114 and in engagement with the female contacts 115 therein. At the same time, the pointed member 111 of the central contact 106 pierces tab 96 of package 10, while one of the contacts 105 or 107 pierces contact 92, depending on the position of package 86 in cooker 97. The spring biasing of these piercing elements is of extreme importance because it insures a good engagement of the contacts with the tabs. Any defective engagement would create additional resistance and impair the efficiency of operation afforded by the cooker. Current will now flow from the electrode 94 through the food content in package 86 to electrode 91. A visual signal comparable to that shown at 54 in FIG. 1 is also included and its operation, as well as that of the terminators, is the same as that described above in connection with FIGS. 4, 5 and 6.

While package 10 has been described as particularly intended for the cooker of FIGS. 1, 2 and 3, and the package 86 for the cooker of FIGS. 9 and 10, it is notable that either of the packages 10 or 86 may be used with either of the two embodiments of the heater.

While preferred specific embodiments are herein disclosed, it is to be clearly understood that the invention is not to be limited to the exact constructions, mechanisms and materials illustrated and described because various modifications of these details may be provided in putting the invention into practice.

What is claimed is:

1. In an electric resistance cooker for a food package having a wall structure enclosing a food portion, a pair of electrodes carried by said wall structure and engaging said food portion and a tab integral and each electrode and extending to the exterior of said wall structure,
   a. walls of electric insulating material defining a cooking chamber, with one of said walls being removable from the other walls to provide an access opening through which said food package is inserted into said cooking chamber, said walls including a bottom wall, side walls upstanding from said bottom wall, a rear wall and a top wall and in which a beam extends forwardly from said rear wall at the central portion of the upper edge thereof to the front edge of said top wall, said spring-biased contacts taking the form of spring clips mounted on said beam and the inner faces of said side walls and said bottom, top and side walls having ends defining said access opening and a sliding front wall movable into a position closing said access opening;
   b. a pair of spring-biased contacts mounted on said walls and in conductive engagement with said tabs when said food package is received in said cooking chamber and said movable wall is in closed position, and
   c. an electric circuit including a pair of conductors terminating in a plug that is connected to an outlet receptacle providing electric current, and
      i. a normally open switch which is closed by the movable wall when the latter is in position closing said cooking chamber, and
      ii. a terminator for interrupting the circuit to said contacts upon completion of a predetermined cooking period for the food in said package.

2. The electric resistance cooker of claim 1, together with a tray slidable through said access opening and receiving said food package, said tray when in fully closed position permitting downward movement of said front wall to a fully closed position which closes said normally open switch.

3. The electric resistance cooker of claim 2, together with a cross strut extending between the forward edges of said side walls and having downwardly opening recesses which accommodate tabs on the food package when in vertical position as the food package is inserted into the space between said side walls.

4. The electric resistance cooker of claim 3 in which the door has an inwardly extending flange on its upper edge and the normally open switch is mounted in a recess opening onto the top edge of said cross strut and which includes a push button which is engaged by the flange on the door when the latter is in fully closed position.

5. The electric resistance cooker of claim 2 in which said tray is formed with a shallow depression which receives and positions the food package, and means for limiting upward movement of the tray relative to the side walls.

6. The electric resistance cooker of claim 4 together with a visual signal wich is mounted on said cross strut and visible from the front face thereof.

* * * * *